United States Patent [19]
Fujita et al.

[11] Patent Number: 4,652,718
[45] Date of Patent: Mar. 24, 1987

[54] WORKPIECE FEEDING APPARATUS IN SEAM WELDING MACHINE

[75] Inventors: Yoshihide Fujita, Hidaka; Hirofumi Morita, Shiki, both of Japan

[73] Assignee: Honda Giken Kogyo Kabushiki Kaisha, Tokyo, Japan

[21] Appl. No.: 739,797

[22] Filed: May 31, 1985

[51] Int. Cl.⁴ .............. B23K 11/06; B23K 37/04; B25J 17/02
[52] U.S. Cl. .................. 219/82; 219/158; 901/29
[58] Field of Search ............... 219/125.1, 117.1, 158, 219/159, 82; 901/41, 42, 29, 40

[56] References Cited

U.S. PATENT DOCUMENTS 4,392,766  7/1983  Blunt ........................ 901/40 X
4,574,655  3/1986  Kimura et al. ............... 901/29 X

FOREIGN PATENT DOCUMENTS 78113    5/1983  European Pat. Off. ......... 901/29
3002012  8/1980  Fed. Rep. of Germany ....... 901/29

OTHER PUBLICATIONS

"Hydro-Wrist", Bird-Johnson Company, Apr. 18, 1983.
"Resistance Welding at Work", Sciaky Bros., Inc., Jan. 12, 1948.

Primary Examiner—E. A. Goldberg
Assistant Examiner—C. M. Sigda
Attorney, Agent, or Firm—Armstrong, Nikaido, Marmelstein & Kubovcik

[57] ABSTRACT

A wrist portion assembly for a workpiece feeding apparatus of a seam welding machine wherein a workpiece is supported through a chucking device on an operational end of a robot so that a portion of the workpiece to be welded is fed between a pair of upper and lower electrode rolls. The wrist portion includes plural turnable members. At least one of the turnable members which serves to move the chucking device upwardly and downwardly by the turning thereof is formed into an idle turnable member having no driving source.

4 Claims, 6 Drawing Figures

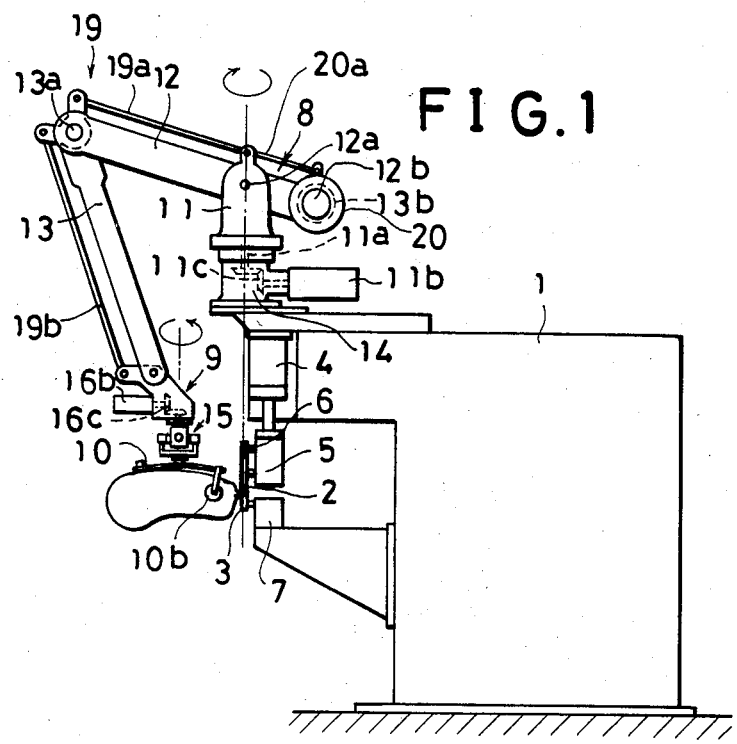
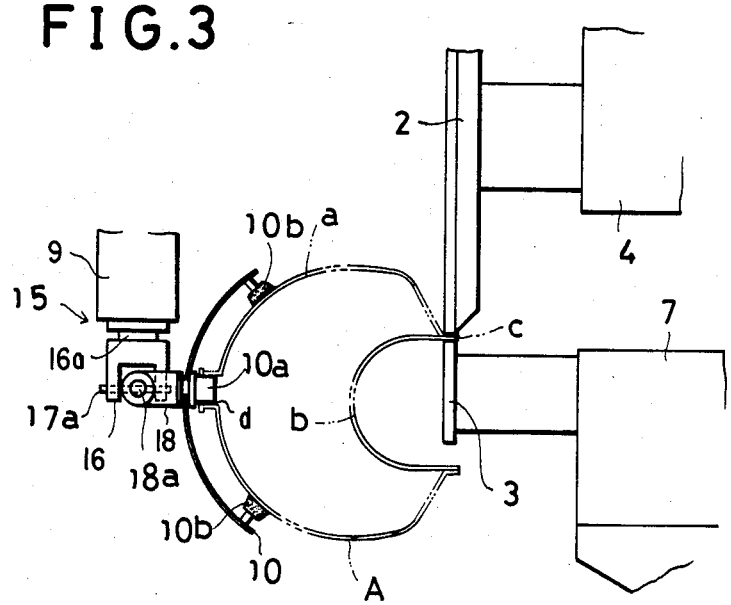

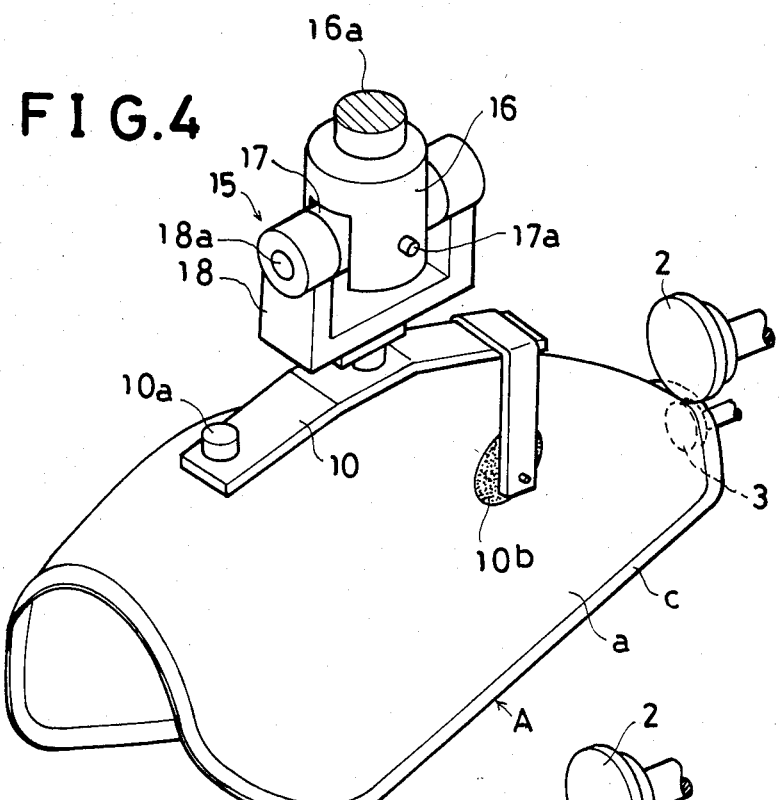
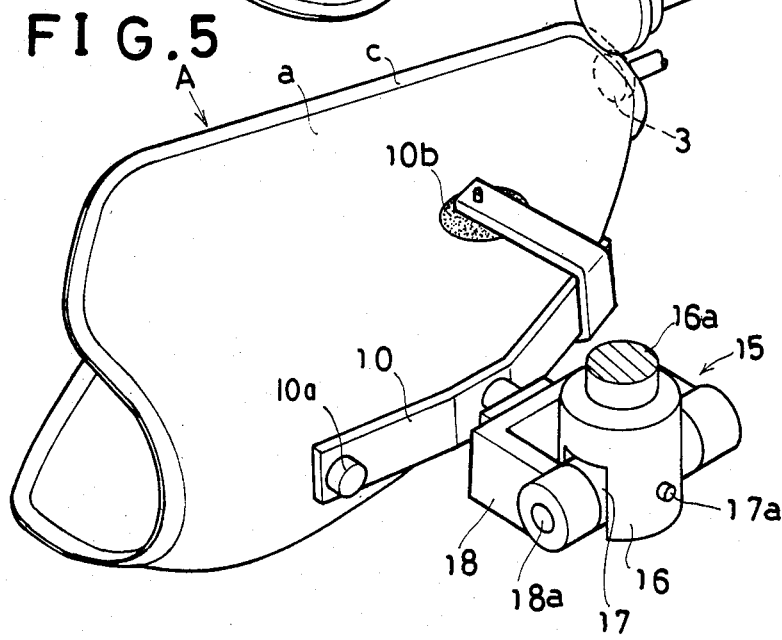

WORKPIECE FEEDING APPARATUS IN SEAM WELDING MACHINE

BACKGROUND OF THE INVENTION

This invention relates to a workpiece feeding apparatus in a seam welding machine for automating a seam welding operation on a workpiece such as a two-wheeled vehicle fuel tank or the like.

The inventors of the subject matter of this application have previously developed a combination apparatus wherein a workpiece is supported through a chucking means on an operational end of a robot so that the portion of the workpiece to be welded may be fed between a pair of upper and lower electrode rolls provided on a seam welding machine. All the respective arms of the robot and the respective turnable members of a wrist portion thereof are arranged to be controlled to be turned in accordance with respective signals by respective driving sources so that the workpiece may be positively moved along on a teaching locus. However, in this apparatus, a particular inconvenience as described below arises.

Namely, there occurs generally a phenomenon in repeated seam welding operations that the holding position for the workpiece by the two electrode rolls deviates towards the lower electrode roll side due to abrasion of the rolls or the like. Consequently, if the workpiece is driven to be moved as above along on the teaching locus, an undesirable force is generated between the workpiece and the chucking means. It becomes impossible to reliably hold the workpiece between the rolls. An inconvenience of the workpiece coming off from the chucking means or derailing of the electrode rolls from the portion to be welded can result.

OBJECT AND SUMMARY OF THE INVENTION

This invention has for its object to provide an apparatus free from the foregoing inconvenience. This invention is designed for an apparatus of the type that a workpiece is supported through a chucking means on an operational end of a robot so that a portion of the workpiece to be welded may be fed between a pair of upper and lower electrode rolls provided on a seam welding machine. The invention characterized in that, among plural turnable members constituting the wrist portion of the robot, at least one of the turnable members serving to move the chucking means in the upward and downward directions by the turning thereof is formed into an idle turnable member having no driving source.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is a side view of one example of a seam welding machine having this invention;

FIG. 3 is an enlarged side view of an important portion thereof; and

FIGS. 4-6 are perspective views of important portions thereof for explaining the operations thereof.

DETAILED DESCRIPTION OF A PREFERRED EMBODIMENT

Figure 2:
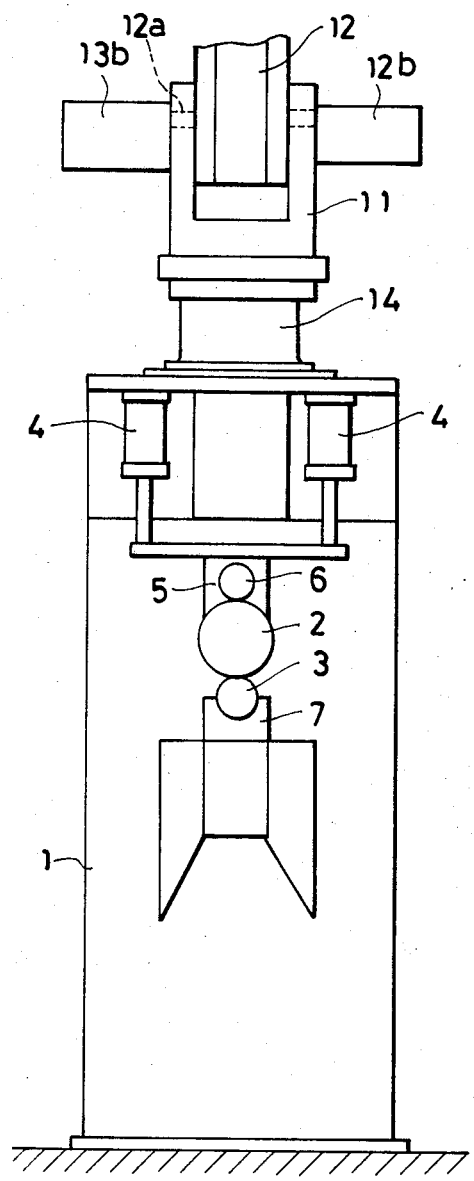
FIG. 2 is a front view thereof.

One embodying example of this invention will now be explained with reference to the accompanying drawings:

Referring to FIGS. 1 and 2, a machine body 1 of a seam welding machine has a pair of upper and lower electrode rolls 2, 3 provided on a front portion thereof. As shown clearly in FIG. 2, the upper electrode roll 2 is rotatably supported on an electrode holder 5 arranged to be movable upwards and downwards by a pair of right and left pressure applying cylinders 4, 4. The electrode holder 5 is provided with a knurled member 6 which is in abutment with a circumferential surface of the upper electrode roll 2 so that the upper electrode roll 2 may be driven to rotate through rotation of the knurled member 6 by a driving source (not illustrated). The lower electrode roll 3 is rotatably supported on an electrode holder 7 fixed to the machine body 1 so that if the upper electrode roll 2 is lowered by the pressure applying cylinders 4, 4, a portion of a two-wheeled vehicle fuel tank A constituting a workpiece to be welded, that is, a butt flange portion c of a tank outer panel a and a tank bottom panel b as shown clearly in FIG. 3 may be held between the upper electrode roll 2 and the lower electrode roll 3. When, under this condition, the upper electrode roll 2 is rotated, the flange portion c may be subjected to a seam welding thereof when electric power is supplied to the electrode rolls.

For automating this seam welding operation, in the illustrated example, a robot 8 is mounted on the machine body 1 and the fuel tank A is supported through a chucking means 10 on a wrist portion 9 attached to the operational end of the robot 8 so that the flange portion c of the fuel tank A may be fed between the two electrode rolls 2, 3.

More in detail, the robot 8 comprises a robot main body 11 which is turnable about a vertical turning shaft 11a, a first arm 12 which extends forwards from the robot main body 11 and is swingable in upper and lower directions about a horizontally extended turning shaft 12a provided on a rear portion thereof, and a second arm 13 which extends downwards from the first arm 12 and is swingable in front and rear directions about a horizontally extended turning shaft 13a provided on an upper portion of the second arm. The wrist portion 9 is attached to a lower end of the second arm 13, that is, the operational end of the robot 8 so that the wrist portion 9 may be moved three-dimensionally in any desired direction by a composition of respective movements of the robot main body 11 and the two arms 12, 13.

The robot main body 11 is arranged to be turnable through a bevel gear means 11c by an electric motor 11b provided on a base member 14 on a lower side thereof. The respective arms 12, 13 are arranged to be movable to swing by respective electric motors 12b, 13b attached right and left to an attaching base 20 pivotally provided on a rearwardly extended portion of the first arm 12 as shown clearly in FIG. 1, through respective chains (not illustrated) applied between the motors 12b, 13b and the respective turning shafts 12a, 13a, respectively. A link 20a is provided between the base 20 and the main body 11 to be in parallel with the extended portion.

It is necessary for the foregoing wrist portion 9 to be constructed and function to cause the posture of the fuel tank A to change three-dimensionally in any desired direction in accordance with the shape of the flange portion c which is curved three-dimensionally. For achieving this, in the illustrated example, the wrist portion 9 is formed as a three-shaft constructional one that comprises a wrist main body 15 supported on a lower end of the second arm 13, a first turnable member 16 provided on the wrist main body 15 turnable about a vertical shaft 16a, a second turnable member 17 provided on the first turnable member 16 turnable about a horizontal shaft 17a as shown clearly in FIG. 4, and a third turnable member 18 provided on the second turnable member 17 turnable about a shaft 18a extending at right angles in relation to the horizontal shaft 17a. The chucking member 10 is detachably attached to the third turnable member 18.

Among the three turnable members 16, 17, 18 constituting the wrist portion 9, the ones which serve to move the chucking means in upward and downward directions by the turning thereof are the second turnable member 17 and the third turnable member 18. Accordingly, according to the characteristic feature of this invention, these two turnable members 17, 18 are formed as idle turnable members having no driving sources.

The first turnable member 16 is arranged to be driven to turn through a bevel gear means 16c by an electric motor 16b, that is, a driving source provided on the wrist main body 15. Additionally, there is provided a parallel ruler mechanism 19 comprising a pair of links 19a, 19b extending along the two arms 12, 13 which is arranged so that the wrist main body 15 may be given a parallel motion while being kept in a constant posture condition, even when the two arms 12, 13 are moved to swing. Thus, the shaft 16a of the first turnable member 16 supported on the wrist main body 15 may be kept always in its vertical posture.

The chucking means 10 is provided with a gripping member 10a for gripping a charging opening portion d of the fuel tank A and a pair of attaching parts 10b, 10b for sticking fast to an outer surface of the tank A.

Figure 6:
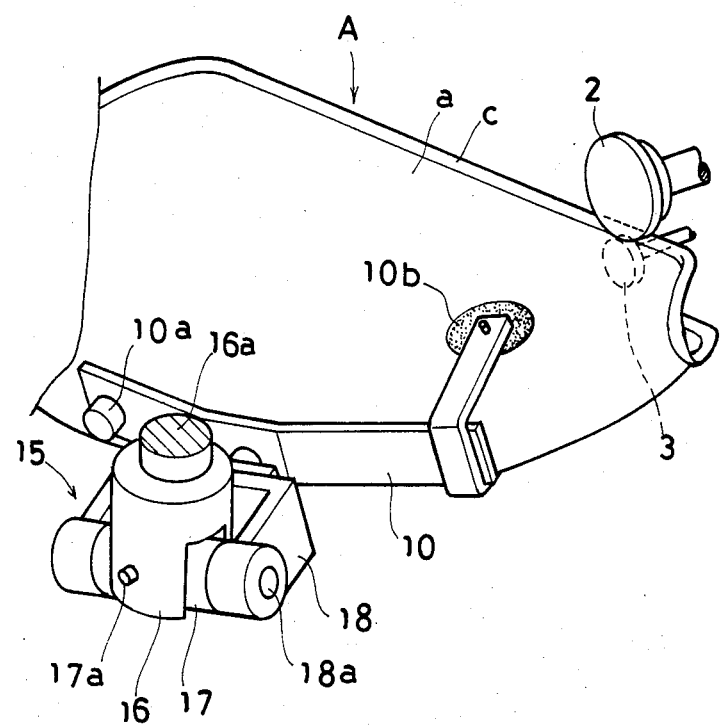

Next, the operation of the foregoing apparatus will now be explained as follows:

Under the condition that the fuel tank A is held on the chucking means 10, a desired part of the flange portion c thereof is placed on the lower electrode roll 3. Then, the upper electrode roll 2 is lowered, so that the part of the flange portion c is held between the two electrode rolls 2, 3. Thereafter, the upper electrode roll 2 is rotated and electric power is supplied. At the same time, the robot main body 11 and the two arms 12, 13 are operated so that the wrist portion 9 may be moved along on the previously taught three-dimensional locus. Additionally, by respective movements of the first, second and third turnable members 16, 17, 18, the posture of the fuel tank A is changed three-dimensionally, whereby every part of the flange portion c is continuously fed between the two electrode rolls 2, 3 as shown in FIGS. 4–6.

During this operation, because of the fact that the tank A is held at the flange portion c thereof between the two electrode rolls 2, 3, if the first turnable member 16 of the wrist portion 9 is determined in its position and in its turned phase, the posture of the tank A is primarily determined in accordance with special co-ordinates of the holding position by the two electrode rolls 2, 3. As a result, the tank A can be controlled in its predetermined posture, even without controlling of the turning motions of the remaining turnable members 17, 18 of the wrist portion 9 by respective teaching signals.

In such a manner as described above, a seam welding over the whole circumference of the flange portion c is carried out for each tank. However, by repeated seam welding operations thereof, it often happens that the holding position for the tank portion c by the two electrode rolls 2, 3 deviates downwards due to abrasion of the rolls or the like. If, in this case, it is assumed that the second and third turnable members 17, 18 serving to move the chucking means 10 in upward and downward directions be controlled in their turning motions in accordance with respective teaching signals by their respective driving sources, the movement of the chucking means 10 by the turnable members 17, 18 cannot follow the downward deviation of the holding position, and there is generated an undesirable force between the chucking means 10 and the fuel tank A.

However, according to this invention, the two turnable members 17, 18 are formed with idle turnable members having no driving sources, so that such a movement of the chucking means 10 that follows the upward and downward directional deviation of the holding position is allowed by free turning of each of the two turnable members 17, 18, and thereby there is not caused such an inconvenience as described above.

Thus, according to this invention, among the plural turnable members constituting the wrist portion, at least one thereof serving to move the chucking means in upward and downward directions by the turning thereof is formed into an idle turnable member having no driving source, so that any deviation in upper and lower directions of the holding position for the workpiece by the pair of upward and downward electrode rolls can be followed by those turnable members. No generation of an undesirable force between the chucking means and the workpiece occurs. Consequently, such an inconvenience as coming-off of the workpiece or derailing of the electrode rolls is eliminated. Additionally, as a result of no need of driving sources for those turnable members, the wrist portion can be made small in size and simple in construction which is advantageous from an aspect of cost.

It is readily apparent that the above-described workpiece feeding apparatus in seam welding machine meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A welding apparatus including a workpiece feeding apparatus comprising:

a seam welding machine having a machine body and a pair of electrode rolls provided on the machine body capable of engaging a flange portion of a workpiece for welding a seam thereon, and means for driving one of said electrode rolls;

a workpiece feeding apparatus comprising a robot mechanism supporting a chucking means for holding a workpiece for welding by said welding machine, said robot mechanism being capable of translational movements along three mutually perpendicular coordinates and including a wrist portion providing for rotational movements about first, second and third rotational axes mutually perpendicular to each other;

said workpiece feeding apparatus being arranged with respect to said welding machine to hold a workpiece in position for engagement of a three-dimensionally curved flange portion thereof by said electrode rolls and for controlling the posture of said workpiece to maintain said flange portion between said electrode rolls; and said robot mechanism being provided with controllable driving means for driving and controlling said translational movements of said workpiece and for driving and controlling rotational movement of said workpiece about said first rotational axis, said second and third rotational axes being formed with idle turnable members having no driving sources such that deviations in posture of the holding position of the workpiece about said second and third rotational axes will be caused solely by said driving means for said welding rolls, thereby avoiding generation of undesirable forces between said chucking means and said workpiece.

2. A welding apparatus as recited in claim 1, wherein rotational movement of said workpiece about of said first rotational axis corresponds to direction of movement of said flange portion between said electrode rolls.

3. A welding apparatus as recited in claim 1, wherein upward and downward movement of said flange portion caused by driving of said flange portion between said electrode rolls causes rotational movement of said workpiece held in said chucking means about said second and third rotational axes.

4. A welding apparatus as recited in claim 1, wherein said robot mechanism controls the posture of the holding position of said workpiece by said translational movements and by rotation about said first axis, and said electrode rolls control rotational movement of said workpiece about said second and third rotational axes.

* * * * *